(12) United States Patent
Xiong et al.

(10) Patent No.: US 12,717,275 B2
(45) Date of Patent: Aug. 25, 2026

(54) METHOD OF DUPLICATING A HOLOGRAM COMPRISING A STEP OF PREPARING A MASTER WITH A MASTER HOLOGRAM AND HOLOGRAM OPTICAL ELEMENT

(71) Applicants: University of Central Florida Research Foundation, Inc., Orlando, FL (US); Goertek Inc., Weifang (CN)

(72) Inventors: Jianghao Xiong, Orlando, FL (US); Tao Zhan, Oviedo, FL (US); Kun Li, Santa Clara, CA (US); Shin-Tson Wu, Oviedo, FL (US)

(73) Assignees: University of Central Florida Research Foundation, Inc., Orlando, FL (US); Goertek Inc., Weifang (CN)

( * ) Notice: Subject to any disclaimer, the term of this patent is extended or adjusted under 35 U.S.C. 154(b) by 296 days.

(21) Appl. No.: 18/570,847

(22) PCT Filed: Jun. 10, 2022

(86) PCT No.: PCT/CN2022/098216

§ 371 (c)(1),
(2) Date: Dec. 15, 2023

(87) PCT Pub. No.: WO2022/262661

PCT Pub. Date: Dec. 22, 2022

(65) Prior Publication Data

US 2024/0302793 A1 Sep. 12, 2024

Related U.S. Application Data

(60) Provisional application No. 63/210,756, filed on Jun. 15, 2021.

(51) Int. Cl.
*G03H 1/20* (2006.01)
*G02B 5/32* (2006.01)
(Continued)

(52) U.S. Cl.
CPC ............... *G03H 1/202* (2013.01); *G02B 5/32* (2013.01); *G03H 1/0256* (2013.01);
(Continued)

(58) Field of Classification Search
CPC ................ G03H 1/202; G03H 1/0256; G03H 2001/0439; G03H 2222/31;
(Continued)

(56) References Cited

U.S. PATENT DOCUMENTS

2006/0044458 A1* 3/2006 Kato ...................... H04N 23/75 348/E5.04
2022/0317624 A1* 10/2022 Tu ........................... G02B 5/32
2023/0049424 A1* 2/2023 Mitobe .................... G02B 5/18

FOREIGN PATENT DOCUMENTS

CN 103105766 A 5/2013
CN 110554593 A 5/2018
CN 111684362 A 9/2020

OTHER PUBLICATIONS

Xiong, Jianghao et al., "Aberration-free pupil steerable Maxwellian display for augmented reality with cholesteric liquid crystal holographic lenses", Optics Letters, vol. {0} 7, No. {0} 46, Apr. 1, 2021 (Apr. 1, 2021), ISSN:0146-9592, pp. 1760-1762 of the description.

* cited by examiner

*Primary Examiner* — Paul C Lee
(74) *Attorney, Agent, or Firm* — Baker Botts LLP

(57) ABSTRACT

Here discloses a method for duplicating a hologram and a hologram optical element. The method comprises: preparing a master with a master hologram; preparing a sample with coated photoalignment material layer above the master; and irradiating a recording light through the sample to the master, so that at least one portion of the recording light is reflected by the master as an object light carrying the master hologram information, and so that the object light and the
(Continued)

recording light are interfered at the photoalignment material layer to produce a duplicated hologram in the photoalignment material layer.

13 Claims, 4 Drawing Sheets

(51) Int. Cl.
*G03H 1/02* (2006.01)
*G03H 1/04* (2006.01)

(52) U.S. Cl.
CPC . *G03H 2001/0439* (2013.01); *G03H 2222/31* (2013.01); *G03H 2240/53* (2013.01); *G03H 2240/55* (2013.01); *G03H 2250/38* (2013.01)

(58) Field of Classification Search
CPC ........... G03H 2240/53; G03H 2240/55; G03H 2250/38; G03H 2240/15; G03H 2250/41
See application file for complete search history.

METHOD OF DUPLICATING A HOLOGRAM COMPRISING A STEP OF PREPARING A MASTER WITH A MASTER HOLOGRAM AND HOLOGRAM OPTICAL ELEMENT

CROSS-REFERENCE TO RELATED APPLICATIONS

This application is a National Stage of International Application No. PCT/CN2022/098216, filed on Jun. 10, 2022, which claims priority to U.S. Provisional Application No. 63/210,756, filed on Jun. 15, 2021, both of which are hereby incorporated by reference in their entireties.

FIELD OF THE INVENTION

This disclosure relates to the technical field of polarization hologram, and more specifically, to a method for duplicating a hologram and a hologram optical element.

BACKGROUND OF THE INVENTION

Usually, an interferometer method or a direct writing method can be used for patterning a photoalignment layer on a substrate. The interferometer method uses two arms of laser beams to form a polarization pattern. The interferometer is sensitive to environmental disturbance and can usually form a small pattern in each exposure process. The direct writing method uses a focused laser beam with controllable polarization state to write a pattern, which often requires a long processing time.

SUMMARY OF THE INVENTION

This disclosure is to provide a new technical solution for a polarization hologram.

According to a first embodiment, there is provided a method for duplicating a hologram, comprising: preparing a master with a master hologram; preparing a sample with coated photoalignment material layer above the master; and irradiating a recording light through the sample to the master, so that at least one portion of the recording light is reflected by the master as an object light carrying the master hologram information, and so that the object light and the recording light are interfered at the photoalignment material layer to produce a duplicated hologram in the photoalignment material layer.

According to a first embodiment, there is provided a hologram optical element manufactured by using the method according to an embodiment.

According to various embodiments, the polarization holograms disclosed here are suitable for low-cost mass production.

Further features of the disclosure and advantages thereof will become apparent from the following detailed description of exemplary embodiments according to the disclosure with reference to the attached drawings.

BRIEF DESCRIPTION OF THE DRAWINGS

The accompanying drawings, which are incorporated in and constitute a part of the specification, illustrate embodiments of the invention and, together with the description thereof, serve to explain the principles of the invention.

DETAILED DESCRIPTION OF THE EMBODIMENTS

Figure 1:
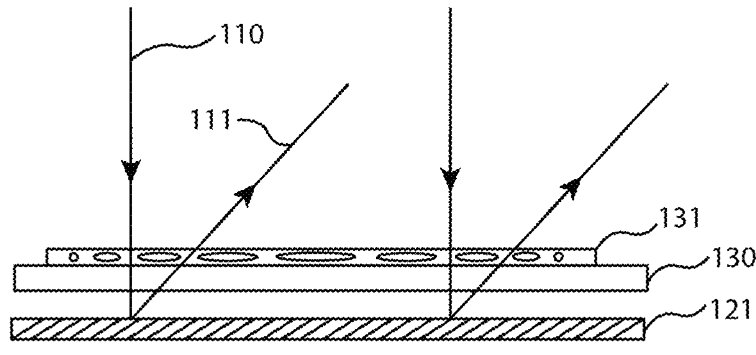
FIG. 1 is a schematic plane view of pattern copying procedure according to an exemplary embodiment of the present disclosure.

Various exemplary embodiments of the disclosure will now be described in detail with reference to the drawings. It should be noted that the relative arrangement of the components and steps, the numerical expressions, and numerical values set forth in these embodiments do not limit the scope of the disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

The interferometer method and the direct writing method have limitations and are not suitable for low-cost mass production of polarization holograms.

Therefore, this disclosure proposes a hologram such as a polarization hologram. The hologram can be based on liquid crystals and are based on photoalignment technique. For example, a layer of photoalignment material is patterned and a liquid crystal layer is deposited on top of it. In such an approach, a reflective or transmissive hologram can be formed according to the type of the liquid crystal layer used.

The technical solution according to an embodiment is suitable for low-cost mass production of polarization holograms.

In an embodiment, an existing reflective polarization hologram can be used as the template or mater. polarization holograms can be fabricated by using the existing reflective polarization hologram. More particularly, a light is reflected by the reflective polarization hologram and forms polarization pattern. The polarization pattern is transferred by the reflected light to the sample with photoalignment material. The patterned sample can form a hologram optical element by depositing liquid crystal materials on top. The hologram optical element can used for reflective/transmissive liquid crystal lenses, gratings, or other type of optical elements.

The procedures disclosed here may include a procedure of pattern copying with a master such as a film master and a procedure of liquid crystal deposition. The film master may be a patterned reflective polarization element fabricated with cholesteric liquid crystal. A sample with coated photoalignment material is placed in parallel with film master. The recording light is incident on a sample followed by the film master hologram. The incident light together with reflected light from the film master forms a polarization pattern on the sample. A liquid crystal layer is deposited on patterned sample and forms transmissive or reflective polarization holograms.

For example, the film master is a reflective polarization optical element with recorded patterns, and the efficiency of film master at the exposure wavelength should be reasonably high. To duplicate the polarization pattern of film master with exposure, a substrate with deposited photoalignment material is placed near the film master, while a light beam is incident on the film master from the side of substrate. The light beam is reflected by the film master. The reflected beam and original incident beam together form the polarization pattern, which is recorded onto the substrate with a photoalignment material.

After the exposure, transmissive polarization optical elements can be fabricated by depositing liquid crystals with no or low chiral concentration onto the substrate with a patterned photoalignment material. Reflective polarization optical elements can be fabricated by depositing liquid crystals with high chiral concentration likewise.

In an embodiment, the method for duplicating a hologram may comprises: preparing a master with a master hologram; preparing a sample with coated photoalignment material layer above the master; and irradiating a recording light through the sample to the master, so that at least one portion of the recording light is reflected by the master as an object light carrying the master hologram information, and so that the object light and the recording light are interfered at the photoalignment material layer to produce a duplicated hologram in the photoalignment material layer.

For example, the master is a film master. The sample may include a substrate and the photoalignment material layer is coated on the upward side and/or downward side of the sample. Here, the master hologram and/or the hologram duplicated may also be referred as a hologram pattern. The film master hologram may be a patterned polarization hologram made with cholesteric liquid crystal.

In this embodiment, a master is used for producing a hologram sample and only a recording light is used. The configuration of the system is relatively simple. For example, the sample can be placed in parallel with the master. The object light is derived from the recording light so that is can provide an easy way to produce the hologram. The light path configuration of the system is relatively simple and reliable. This approach is suitable for low-cost mass production of polarization holograms.

In an embodiment, a hologram optical element is formed by placing a liquid crystal layer on the sample. For example, the hologram optical element is formed by depositing liquid crystal material after the duplicated hologram is produced in the photoalignment material layer.

In an example, the liquid crystal layer is a nematic liquid crystal layer and the transmissive hologram optical element by placing the nematic liquid crystal layer. In another example, the liquid crystal layer is a cholesteric liquid crystal layer, and a reflective hologram optical element can be formed by placing the cholesteric liquid crystal layer, wherein the cholesteric liquid crystal layer has a helical pitch range from 250 nanometers to 500 nanometers. In still another example, the liquid crystal layer is a cholesteric liquid crystal layer, and a transmissive hologram optical element can be formed by placing the cholesteric liquid crystal layer, wherein the cholesteric liquid crystal layer has a helical pitch larger than 2000 nanometers. In further still another example, the liquid crystal layer does not have a chiral concentration/dopant.

For example, the thickness of the liquid crystal layer satisfies a half-wave retardation of an input circularly polarized light. The liquid crystal layer has multiple sub-layers, and the sub-layers are formed by liquid crystal with different chiral dopants or concentrations.

A material of the photoalignment material layer is a material that can record polarization pattern with photo-induced optical anisotropy. For example, a material of the photoalignment material layer is azo-dyes, azo-type polyimide or azo-dye. In an example, photoalignment molecules of the photoalignment material layer is patterned with a first pitch.

In an example, the master has a master substrate, a photoalignment layer placed on the substrate and a chiral-doped liquid crystal layer placed on the photoalignment layer. The master hologram is a reflective polarization hologram. For example, the master hologram is a patterned polarization hologram made with cholesteric liquid crystal.

In an example, a chiral dopant of the cholesteric liquid crystal layer may induce a helical structure of liquid crystal molecule with a second helical pitch. A helical axis of the helical structure may be tilted with respect to surface normal of the substrate. The tilted angle of the helical axis with respect to surface normal of the substrate may be set such that the projected period of the second helical pitch of the helical structure in the substrate plane is equal to the period of the first pitch.

The film master may exhibit a diffraction efficiency larger than 80% for recording light. The liquid crystal layer of the master responds to circularly polarized light with the same handedness as the helical structure. The second helical pitch and the thickness of the liquid crystal layer are set so that the diffraction efficiency is larger than or equal to 80% for the incident light.

The recording light and the object light may have the same first polarization. The recording light is circularly polarized. The recording light and the object light have the same first polarization. The object light is circularly polarized light with the same first handedness as the recording light.

In an embodiment, a hologram optical element can be manufactured by using the method as described above.

Below the embodiments and examples will be described with reference to FIGS. 1-7.

FIG. 1 schematically illustrates one embodiment of the method for producing polarization grating pattern from a film master. The use of grating pattern is only for purpose of illustration and should not be limiting. The film master 121 is a reflective polarization grating that reflects circularly polarized light with one handedness. The incident light 110 is circularly polarized with the handedness to have high reflection efficiency from film master 121. The film master reflects light 110 to light 111. Light 111 has the same handedness as light 110. The photoalignment layer 131 is placed on a substrate 130. In some embodiments, photoalignment layer 131 can also be placed on the downward side of substrate 130. The interference of light 110 and 111 produces the copy of polarization pattern on the photoalignment layer 131.

In some embodiments, the photoalignment layer 131 can be azo-dyes, azo-type polyimide, azo-dye containing polymer or other type of materials that can record polarization pattern with photo-induced optical anisotropy. When the pattern is recorded, it can be used to align liquid crystals deposited on top.

Figure 2:
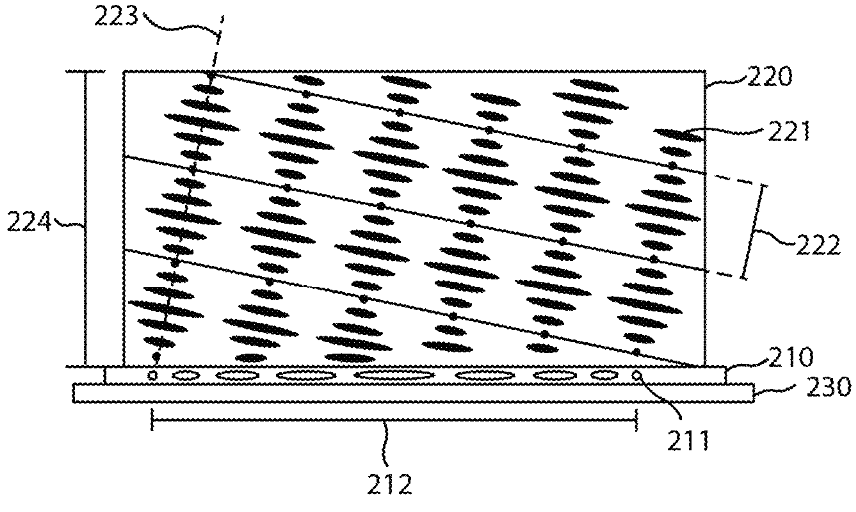
FIG. 2 illustrates the liquid crystal molecular configuration of film master.

The film master is schematically plotted in FIG. 2. A photoalignment layer 210 is placed on a substrate 230. The photoalignment molecule 211 is patterned with pitch 212. Chiral-doped liquid crystal, or so-called cholesteric liquid crystal 220 is placed on the photoalignment layer 210. The chiral dopant induces a helical structure of liquid crystal molecule 221 with helical pitch 222. The helical axis 223 is tilted with respect to surface normal of substrate 230. The tilted angle is set such that the projected period of helical structure in the substrate plane is equal to the period of photoalignment pattern 212. The helical pitch 222 and the thickness of cholesteric liquid crystal layer 224 should be adjusted so that the diffraction efficiency of film master is reasonably high (for example, >80%) for the incident light 110 shown in FIG. 1.

Figures 3, 4:
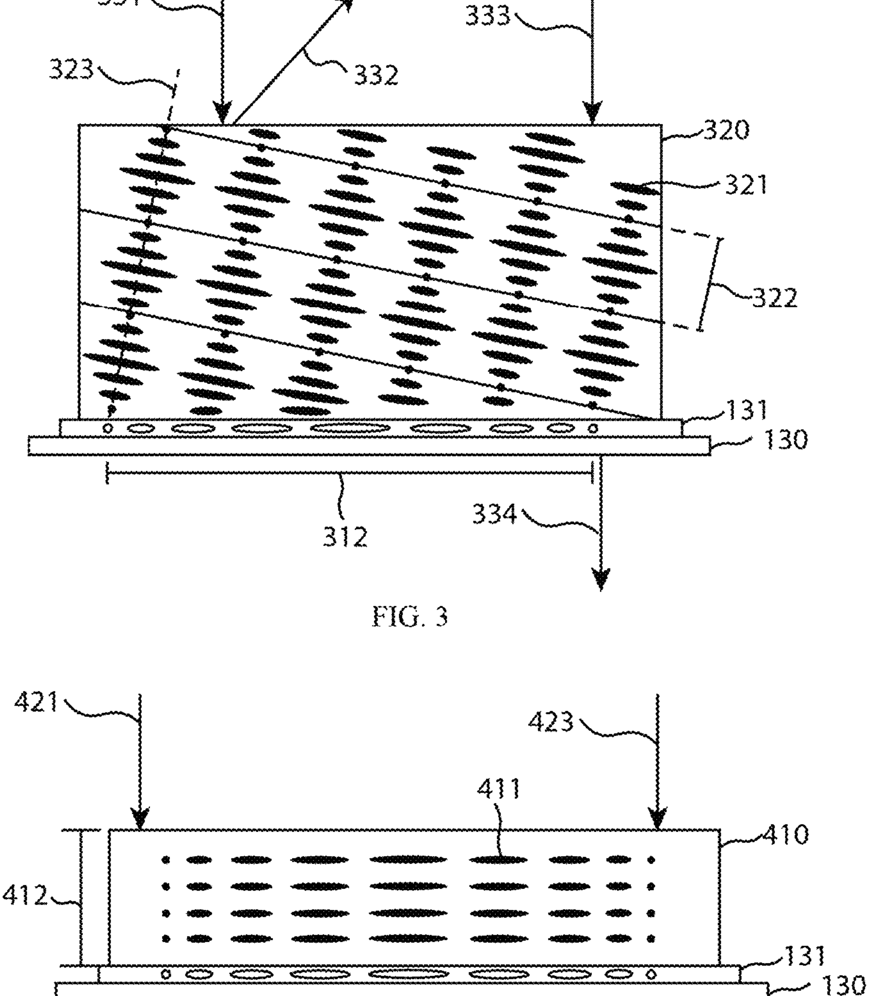
FIG. 3 illustrates the liquid crystal molecular configuration and optical properties of the fabricated reflective hologram by depositing a cholesteric liquid crystal.
FIG. 4. illustrates the liquid crystal molecular configuration and optical properties of the fabricated transmissive hologram by depositing a nematic liquid crystal.

After the pattern exposure process in FIG. 1, a liquid crystal layer can be deposited on the photoalignment layer 131 to form polarization optical elements. The copied grating pattern may have a pitch 312 as shown in FIG. 3, which is same as the grating pattern of film master 212. As FIG. 3 depicts, when a liquid crystal 321 with high chiral dopant concentration is deposited on photoalignment layer 131, the reflective grating 320 can be formed. The grating Bragg pitch 322 can be controlled by adjusting the concentration of chiral dopant. The helical axis 323 is tilted with respect to surface normal of substrate 130. The grating formation mechanism is similar to that of the film master. Grating 320 is polarization sensitive in that it only responds to a circularly polarized light 331 with the same handedness as the helical structure of the liquid crystal 321. Light 331 is diffracted into a first reflection order, forming a light 332. For circularly polarized light 333 with the opposite handedness to light 331, grating 320 has very low diffraction efficiency, letting light 333 go through to become light 334.

As shown in FIG. 4, when liquid crystal 411 with no chiral concentration is deposited on photoalignment layer 131, transmissive grating 410 can be formed. The liquid crystal follows the alignment pattern of 131. When the thickness 412 satisfies the half-wave retardation of input circularly polarized light 421, grating 410 exhibits a high diffraction efficiency of first transmissive order. Light 421 is diffracted into first order and becomes 422. Circularly polarized light 423 having opposite handedness to light 421 is diffracted to the opposite direction, becoming light 424. The use of liquid crystal with no chiral dopant is only for purpose of illustration and should not be limiting. In some embodiments, liquid crystal with low chiral concentration can also be used to fabricate transmissive polarization gratings. In some embodiments, polarization grating 410 can also have multiple layers, with each layer formed by liquid crystal with different chiral dopants or concentrations.

Figure 5:
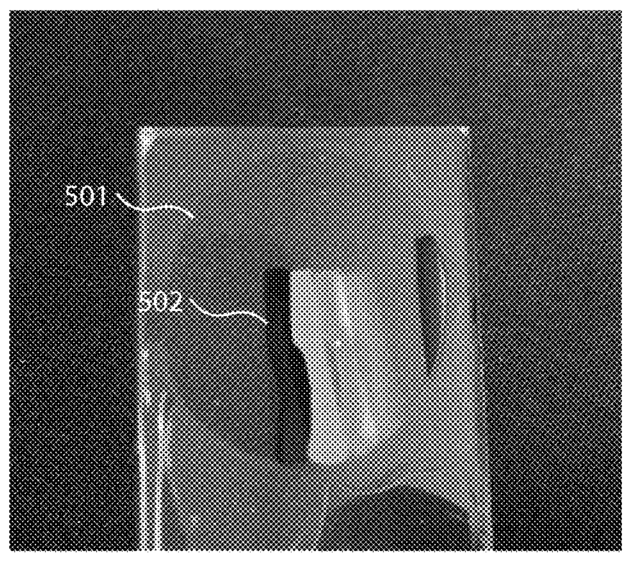
FIG. 5 shows the photo of a film master with off-axis lens pattern.
Figure 6:
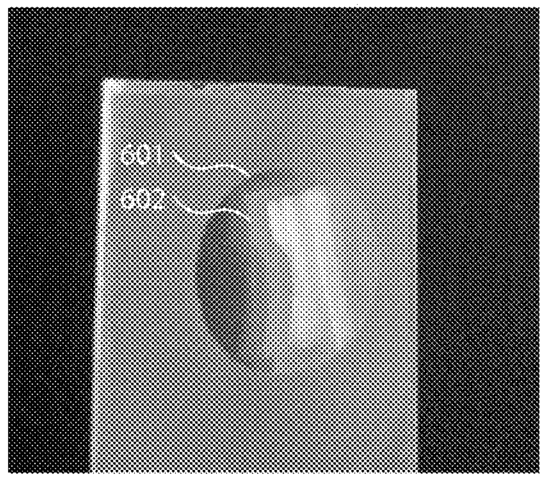
FIG. 6. shows the photo of a fabricated sample with method described in the invention.
Figure 7:
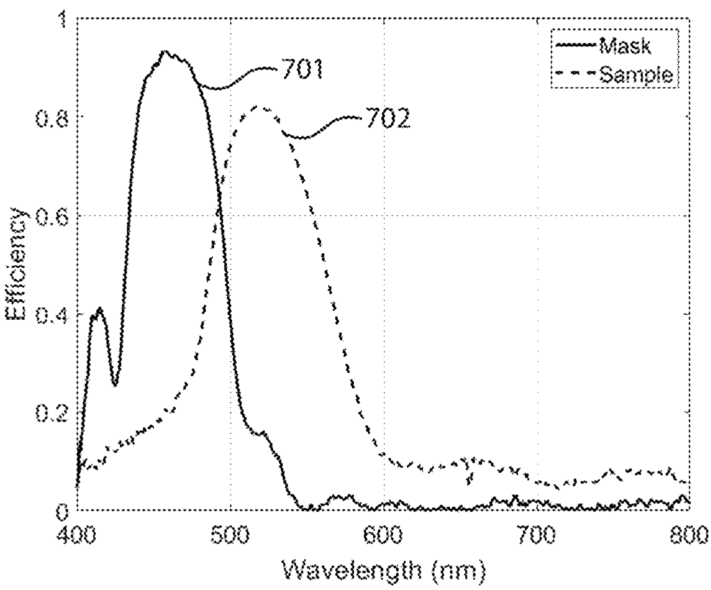
FIG. 7 shows the efficiency of film master and fabricated sample with respect to wavelength.

FIG. 5 shows a film master 501 with off-axis lens pattern. The wavelength of recording laser is 457 nm. The film master has high efficiency for blue light. The off-axis lens forms an image 502 of ceiling lamp. FIG. 6 shows a sample 601 fabricated by pattern copying from film master 501 of FIG. 5. The sample also has off-axis pattern and forms image 602 of ceiling lamp. FIG. 7 shows the diffraction efficiencies of film mask and fabricated sample. The efficiency spectrum of film master 701 is over 90% for the recording wavelength at 457 nm. The fabricated sample uses a different chiral concentration so the central peak of the spectrum 701 shifts to 520 nm.

In another embodiment, an apparatus for replicating a polarization pattern from the film master may further be provided.

For example, the pattern of the hologram optical element can later be used to produce reflective or transmissive polarization optical elements by depositing liquid crystal materials with different chiral concentrations.

Although some specific embodiments of the disclosure have been demonstrated in detail with examples, it should be understood by a person skilled in the art that the above examples are only intended to be illustrative but not to limit the scope of the disclosure.

What is claimed is:

1. A method for duplicating a hologram, comprising:

preparing a master with a master hologram, wherein the master has a first substrate, a first photoalignment layer placed on the first substrate and a chiral-doped liquid crystal layer placed on the first photoalignment layer;

preparing a sample coated with a second photoalignment material layer above the master, wherein the sample comprises a second substrate, and the second photoalignment material layer is coated on an upward side and/or downward side of the sample; and irradiating a recording light through the sample to the master, so that at least one portion of the recording light is reflected by the master as an object light carrying the master hologram information, and so that the object light and the recording light are interfered on the second photoalignment material layer to produce a duplicated hologram in the second photoalignment material layer.

2. The method according to claim 1, further comprising:

forming a hologram optical element by placing a liquid crystal layer on the sample.

3. The method according to claim 2, wherein forming a hologram optical element by placing a liquid crystal layer on the sample comprises:

depositing a liquid crystal material after the duplicated hologram is produced in the second photoalignment material layer.

4. The method according to claim 2, wherein the liquid crystal layer is a cholesteric liquid crystal layer, and forming a hologram optical element by placing a liquid crystal layer on the sample comprises:

forming a reflective hologram optical element by placing the cholesteric liquid crystal layer, wherein the cholesteric liquid crystal layer has a helical pitch range from 250 nanometers to 500 nanometers.

5. The method according to claim 2, wherein the liquid crystal layer is a nematic liquid crystal layer, and forming a hologram optical element by placing a liquid crystal layer on the sample comprises:

forming a transmissive hologram optical element by placing the nematic liquid crystal layer.

6. The method according to claim 2, wherein the liquid crystal layer is a cholesteric liquid crystal layer, and forming a hologram optical element by placing a liquid crystal layer on the sample comprises:

forming a transmissive hologram optical element by placing the cholesteric liquid crystal layer, wherein the cholesteric liquid crystal layer has a helical pitch larger than 2000 nanometers.

7. The method according to claim 1, wherein a helical pitch and a thickness of a cholesteric liquid crystal layer are provided so that the master exhibits a diffraction efficiency larger than 80% for the recording light.

8. The method according to claim 1, wherein the recording light and the object light have the same first polarization.

9. The method according to claim 8, wherein the recording light and the object light are circularly polarized light with the same first handedness.

10. The method according to claim 1, wherein the recording light and the object light have the same first polarization.

11. A hologram optical element manufactured by using a method according to claim 1.

12. The method according to claim 1, wherein the master is a reflective polarization grating that reflects circularly polarized light with one handedness.

13. The method according to claim 2, wherein a copied grating pattern of the hologram optical element is same as a grating pattern of the master.

* * * * *